US009687803B2

(12) United States Patent
Alizadeh-Khiavi et al.

(10) Patent No.: US 9,687,803 B2
(45) Date of Patent: Jun. 27, 2017

(54) COMPACT PRESSURE SWING REFORMER

(71) Applicants: AIR PRODUCTS AND CHEMICALS, INC., Allentown, PA (US); ExxonMobil Research and Engineering Company, Annandale, NJ (US)

(72) Inventors: Soheil Alizadeh-Khiavi, Burnaby (CA); Brooke Cox, Vancouver (CA); Kamal Hatami, Vancouver (CA); Daryl Musselman, North Vancouver (CA); Rajeev Agnihotri, Fairfax, VA (US); Paul Berlowitz, Glen Gardner, NJ (US); Bruce Derites, Pittstown, NJ (US); Jeffrey Frederick, Centreville, VA (US); Jeffrey Grenda, Whitehouse, NJ (US); Frank Hershkowitz, Liberty Corner, NJ (US); Zhiguo Hou, Nazareth, PA (US); Novica Rados, Mandeville, LA (US); John Siller, Flemington, NJ (US); Richard Socha, Newtown, PA (US); George Walchuk, Annandale, NJ (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/630,620

(22) Filed: Sep. 28, 2012

(65) Prior Publication Data
US 2013/0270484 A1 Oct. 17, 2013

Related U.S. Application Data

(62) Division of application No. 12/445,934, filed as application No. PCT/US2007/022669 on Oct. 25, 2007, now Pat. No. 8,551,444.

(Continued)

(51) Int. Cl.
B01J 7/00 (2006.01)
C01B 3/22 (2006.01)
(Continued)

(52) U.S. Cl.
CPC .......................................... B01J 8/18 (2013.01)

(58) Field of Classification Search
USPC ............... 48/61, 197 R; 252/373; 423/648.1, 423/650–654; 95/90–148
See application file for complete search history.

(56) References Cited

U.S. PATENT DOCUMENTS 5,820,656 A 10/1998 Lemcoff et al.
5,891,217 A 4/1999 Lemcoff et al.
(Continued)

OTHER PUBLICATIONS

Kelecom, Baudouin, A Breakthrough Process for The Production of Hydrogen, 16th World Hydrogen Energy Conference, Jun. 13-16, 2006.

Primary Examiner — Wayne Langel
(74) Attorney, Agent, or Firm — Eric J. Schaal

(57) ABSTRACT

Embodiments of a compact pressure swing reformer are disclosed. Certain embodiments have a construction comprising multiple rotating reformer beds, high temperature rotary valves at the bed ends, and E-seals to seal the beds to the valves. Several possible designs for introducing reactants into the beds also are disclosed. The multiple reformer beds are configured to provide for pressure equalization and 'steam push'. The compact pressure swing reformer is suitable for use in fuel cell vehicle applications.

17 Claims, 10 Drawing Sheets

Related U.S. Application Data

(60) Provisional application No. 60/854,789, filed on Oct. 27, 2006.

(51) Int. Cl.
  *C01B 3/24*   (2006.01)
  *C01B 3/26*   (2006.01)
  *B01J 8/18*   (2006.01)

(56) References Cited

U.S. PATENT DOCUMENTS

| | | | |
|---|---|---|---|
| 6,063,161 A | 5/2000 | Keefer et al. | |
| 6,565,635 B2 | 5/2003 | Keefer et al. | |
| 6,669,758 B1 | 12/2003 | Hart et al. | |
| 6,712,087 B2 | 3/2004 | Hill et al. | |
| 7,011,693 B2 | 3/2006 | Mallavarapu | |
| 7,250,150 B1 | 7/2007 | Keefer et al. | |
| 7,267,107 B2 | 9/2007 | Magel | |
| 7,350,521 B2 | 4/2008 | Whitley et al. | |
| 7,399,326 B2 | 7/2008 | Zhang et al. | |
| 7,500,490 B2 | 3/2009 | Wagner | |
| 7,799,314 B2 | 9/2010 | Agnihotri | |
| 7,879,138 B2 * | 2/2011 | Lee et al. | 95/96 |
| 8,545,601 B2 * | 10/2013 | Song | 95/96 |
| 2002/0098394 A1 | 7/2002 | Keefer et al. | |
| 2002/0110504 A1 | 8/2002 | Gittleman et al. | |
| 2003/0009943 A1 | 1/2003 | Millet et al. | |
| 2003/0235529 A1 | 12/2003 | Hershkowitz et al. | |
| 2004/0179998 A1 | 9/2004 | Gittleman et al. | |
| 2004/0191166 A1 | 9/2004 | Hershkowitz et al. | |
| 2005/0098034 A1 | 5/2005 | Gittleman et al. | |
| 2005/0160905 A1 | 7/2005 | Whitley | |
| 2007/0172419 A1 | 7/2007 | Peng et al. | |
| 2007/0289446 A1 | 12/2007 | Occhialini et al. | |
| 2011/0023712 A1 | 2/2011 | Rarig et al. | |

* cited by examiner

RVPSR 9 Bed Cycle with 2 Equalizations and Supply Purge

| Stop | Description | # Beds | % time | | Phase (deg) | Pressure (bar) | Feed** | Input** | Output** | Product** | |
|---|---|---|---|---|---|---|---|---|---|---|---|
| 1a | Reforming | 2.5 | 27.8% | start end | 0 100 | 15.0 15.0 | Fuel/Steam | | | Syngas | Production of Syngas For 33% of Cycle |
| 1b | Reforming/Steam Push | 0.5 | 5.6% | start end | 100 120 | 15.0 15.0 | Steam | | | Syngas | |
| 2 | Supply Equalization 1 | 0.5 | 5.6% | start end | 120 140 | 15.0 10.4 | | N/A | Syngas | | Pressure Equalization & Reactor Preparation for 35% of Cycle |
| 3 | Supply Equalization 2 | 0.5 | 2.8% | start end | 140 160 | 10.4 5.8 | | N/A | Syngas | | |
| 4 | Supply Purge | 0.25 | 2.8% | start end | 160 170 | 5.8 3.5 | | N/A | Steam | | |
| 5 | Evacuation | 0.25 | 2.8% | start end | 170 180 | 3.5 1.2 | | N/A | | Steam | |
| 6 | Regeneration | 2.75 | 30.6% | start end | 180 290 | 1.2 1.2 | Fuel/Oxidant | | | Flue Gas | Regeneration for 31% of Cycle |
| 7 | Displacement Purge | 0.25 | 2.8% | start end | 290 300 | 1.2 1.2 | | Steam | N/A | Flue Gas | |
| 8 | Equalization 2 | 0.5 | 5.6% | start end | 300 320 | 1.2 5.8 | | Syngas | N/A | | |
| 9 | Equalization 1 | 0.5 | 5.6% | start end | 320 340 | 5.8 10.4 | | Syngas | N/A | | |
| 10 | Pressurization | 0.5 | 5.6% | start end | 340 360 | 10.4 15.0 | Fuel/Steam | | N/A | | |
| | | 9 | 100% | | | | | | | | |

Notes:
Fuel/Oxidant* - May be supplied by PSA (fuel=CO/H2 from bed purge) and fuel cell (oxidant=O2 depeleted air from cathode exhaust)
Feed* - Sourced from outside the RVPSR system
Input** - Sourced from another bed (e.g. equalization)
Output** - Exhausted to another bed
Product** - Exhausted outside the RVPSR system

FIG. 2d

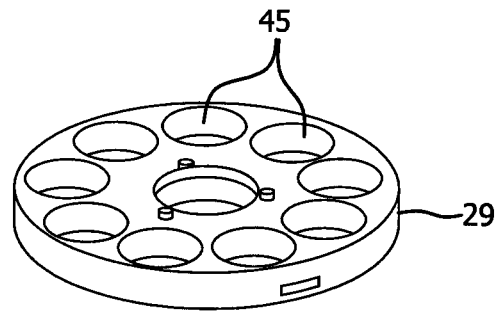
FIG. 6a
FIG. 6b
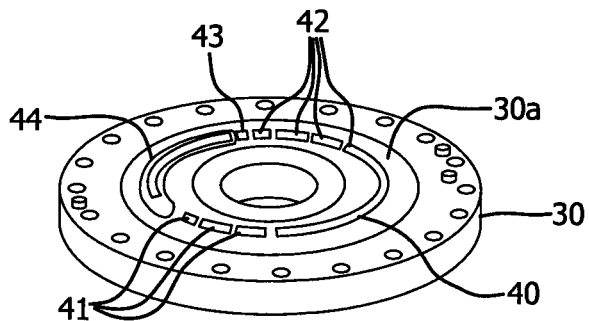
FIG. 7a
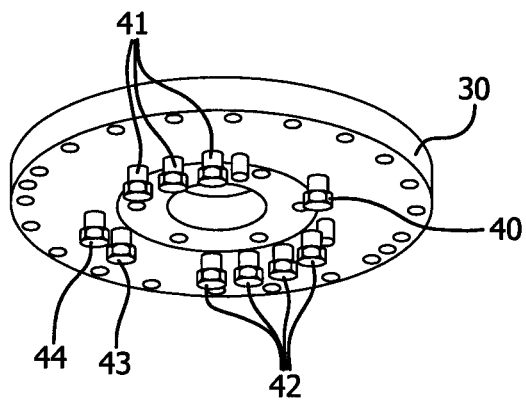
FIG. 7b

COMPACT PRESSURE SWING REFORMER

CROSS-REFERENCE TO RELATED APPLICATIONS

This application is a divisional of U.S. patent application Ser. No. 12/445,934, filed on Apr. 16, 2009, which is a national stage application of PCT International Application No. PCT/US07/22669, filed on Oct. 25, 2007, which claims the benefit of U.S. Provisional Application No. 60/854,789, filed on Oct. 27, 2006, all of which are incorporated by reference as if fully set forth.

BACKGROUND OF THE INVENTION

The present disclosure concerns apparatus and methods for producing hydrogen using a pressure swing reformer. In particular, it concerns compact, multi-bed pressure swing reformers that are suitable, for example, in fuel cell vehicle applications. It also concerns rotary valve constructions for such reformers and for general use in high temperature valve applications.

The typical commercial method for producing hydrogen at present is via steam and/or air reforming of suitable liquid or gaseous hydrocarbon rich fuels. The reforming process involves reacting the hydrocarbon fuel with steam and/or with air or oxygen-enriched air, to produce a syngas stream, which contains hydrogen and also other non-hydrogen by-products including carbon monoxide, carbon dioxide, water, residual hydrocarbon fuel and/or nitrogen. In conventional hydrogen production systems, the carbon monoxide in the syngas stream may be at least partially converted to carbon dioxide by means of the water gas shift reaction to increase the content of hydrogen in the syngas stream, while reducing the content of carbon monoxide (typical high and low temperature water gas shift reactions may reduce the CO concentration in the reformate to about 1% CO).

The development of fuel cell powered vehicles has been pursued in earnest over recent years due to the potential advantages they offer in principle with regards to improved efficiency and emissions reduction. A preferred fuel cell type for this application is the solid polymer electrolyte fuel cell but such cells require a relatively pure source of hydrogen as fuel, with particularly low carbon monoxide levels (typically less than about 50 ppm by volume) to avoid poisoning the anode catalyst. One of the major difficulties to be overcome in fuel cell vehicle development has been in developing a practical means of providing a supply of hydrogen fuel on-board. Hydrogen must either be stored or generated on-board the vehicle but both approaches have faced difficulties. Hydrogen is not easy to store and is usually accomplished either under very high pressures as a compressed gas, as a cryogenic liquid, or adsorbed in heavy, expensive solid alloys. Over the years, attempts have been made to develop compact reformer based subsystems that could process a suitable liquid fuel (e.g. methanol) in order to generate hydrogen on-board. However, satisfactory solutions have proved elusive and, at this time, most fuel cell vehicle developers opt to use gas cylinders in which hydrogen has been compressed to very high pressures (e.g. 5,000-10,000 psi).

Recently however, an improved process for reforming, known as pressure swing reforming (PSR), was invented by Hershkowitz and Deckman. U.S. patent publication No. 2003/0235529 discloses the general construction and operation of pressure swing reformers. The process uses a cyclic, reverse flow reactor which switches between a low pressure combustion step (that heats the reforming catalyst bed) and a high pressure reforming step (that cools the bed). A key improvement associated with this process is that the catalyst bed temperature is hot enough to accomplish the reforming reaction (e.g. >1000.degree. C.) but the reactor inlet and outlet are kept relatively cool (typically <400.degree. C.) thereby simplifying the apparatus. The PSR apparatus therefore may be substantially more compact and less expensive to make than prior art reformers.

A later publication "A Breakthrough Process for the Production of Hydrogen", B. Kelecom et al, ExxonMobil, 16.sup.th World Hydrogen Energy Conference, Jun. 13-16, 2006, discloses how PSR can desirably be used for a hydrogen fuel supply subsystem on-board a fuel cell powered vehicle. Therein, it was demonstrated how PSR apparatus can convert various types of feedstock fuels with very high efficiency and with no apparent deactivation of catalyst. Because of its reduced size and capital cost, a rapid cycle pressure swing adsorption (RCPSA) device is suggested for use in the subsystem in order to separate hydrogen from the PSR product syngas and thereby produce hydrogen of acceptable purity for the fuel cell.

Preferred RCPSA devices typically comprise multiple rotating adsorbent beds in which the beds comprise laminate sheets of immobilized adsorbent. For instance, U.S. Pat. No. 6,565,635 by Keefer discloses suitable compact RCPSAs of such construction. Rotary valves are desirably employed in RCPSAs in order to open and close the adsorbent beds to feed and exhaust the process gases.

The use of two devices employing pressure swing processes in the fuel supply subsystem (PSR and PSA) may offer potential advantages with respect to system integration.

BRIEF SUMMARY OF THE INVENTION

Pressure swing reformers of the invention use multiple beds configured to provide an increase in efficiency and/or operational benefits over previous dual bed designs. In particular, pressure equalizations may be used (in which high pressure gases released from beds which have completed the reforming stage are used to pressurize beds which have completed the regeneration stage) in order to improve efficiency by preserving syngas. Pressure equalization may also reduce the use of "steam push" (in which high pressure steam is used to push syngas out of reformer beds at the end of the reforming stage to enhance the recovery of the syngas). This also may improve efficiency and reduce the water/steam demand of the process.

An important aspect of the compact pressure swing reformer construction is the high temperature rotary valves which open and close the feed and exhaust ends of the reformer beds to the process fluids and which must function properly under demanding cyclic temperature and pressure conditions. Such rotary valves may also find utility in other applications employing high temperature liquids and gases. The rotary valve comprises a stator and a stator seal which rotates with respect to the stator. The stator seal is connected and sealed to an end of each reformer bed. Making this connection can be challenging at temperatures approaching 400.degree. C. Metallic "E seals" proved suitable for this purpose in one embodiment. As used herein, "E seals" are fluid seals having a cross-sectional shape comprising an "E" shape or, fractions, such as ½ fractions, or multiples thereof, e.g., includes seals with ½ or 1.5 "E" shapes, seals with multiple stacked "E" shapes, etc. Both stator and stator seal are provided with appropriately placed ports to allow the passage of fluids to and from the beds when they are appropriately aligned.

The fuel and water reactants may be admitted into the reformer in the form of liquids (e.g. liquid methanol, diesel, gasoline, water) via direct liquid injection. The reformer reactor may be designed such that injected water is vaporized upon entry into steam. Automotive-type direct liquid injectors may be used to admit the liquid reactants into the reformer beds. Alternatively, various rotary valve constructions may also be used for this purpose. (The function and construction of these rotary valves are similar to the aforementioned high temperature rotary valves in certain ways but are not subject to the same cyclic extremes in temperature and pressure.) Direct liquid injection eliminates the need for an external vaporizer (which reduces overall system size) and allows the reforming stage to be operated at greater than atmospheric pressures without using an external compressor (which reduces size, cost, and efficiency).

The foregoing and other objects, features, and advantages of the invention will become more apparent from the following detailed description, which proceeds with reference to the accompanying figures.

BRIEF DESCRIPTION OF SEVERAL VIEWS OF THE DRAWINGS

FIG. 2d is a table showing the details of the operating cycle for the RVPSR of FIG. 2a.

FIGS. 6a and 6b show an oblique top and bottom view respectively of the product stator seal of the RVPSR in FIG. 2.

FIGS. 7a and 7b show an oblique top and bottom view respectively of the product stator of the RVPSR in FIG. 2.

DETAILED DESCRIPTION OF THE INVENTION

Unless expressly defined otherwise, all technical and scientific terms used herein have the same meaning as commonly understood by a person of ordinary skill in the art to which this disclosure belongs. The singular terms "a," "an," and "the" include plural referents unless the context clearly indicates otherwise. Similarly, the word "or" is intended to include "and" unless the context clearly indicates otherwise.

The term "includes" means "comprises."

In the case of conflict, the present specification, including explanations of terms, will control.

The materials, methods, and examples described herein are intended to be illustrative only and are not intended to limit the invention to the specific materials, methods and examples disclosed.

Figure 1:
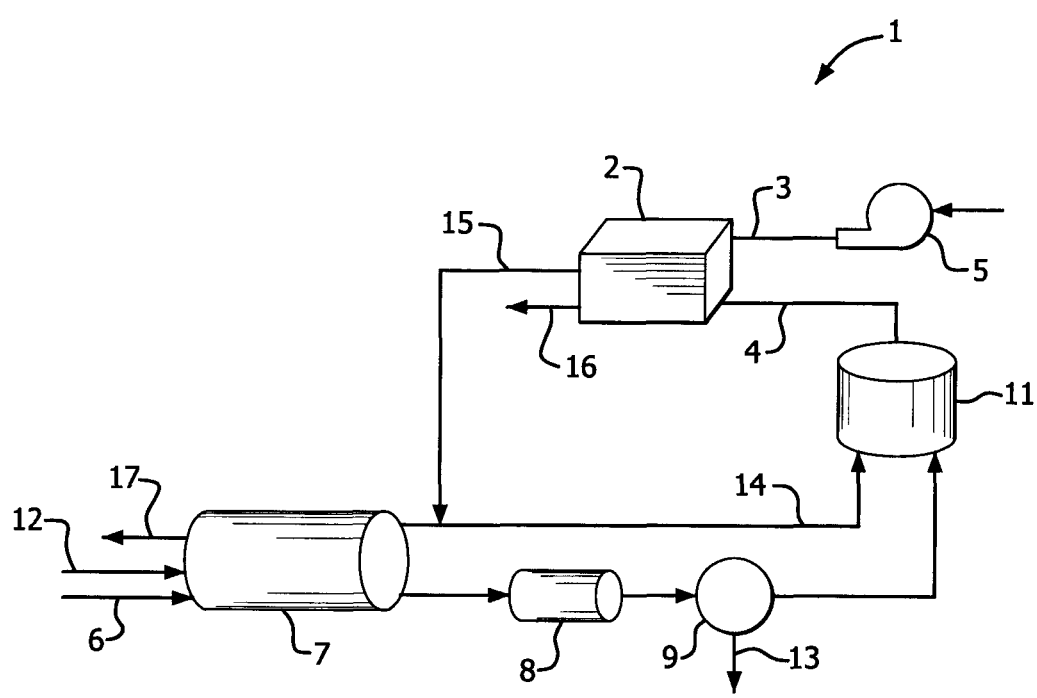
FIG. 1 is a schematic of an electrical power supply system for a fuel cell powered electric vehicle comprising a rotary valve pressure swing reformer (RVPSR) and rapid cycle pressure swing adsorption device (RCPSA).

The compact rotary valve pressure swing reformer (RVPSR) of the invention is desirably employed in all applications where there is a need to generate synthesis gas and/or hydrogen using hydrocarbon fuels (either liquid or gaseous), such as onboard a fuel cell powered electric vehicle for purposes of reforming hydrocarbon fuel feedstocks into hydrogen for the fuel cell. FIG. 1 shows a schematic of a possible electrical power supply system 1 for such a vehicle. System 1 comprises solid polymer electrolyte fuel cell stack 2 which is supplied with pressurized air oxidant at oxidant inlet 3 and hydrogen fuel at fuel inlet 4. A compressor or blower 5 provides the air oxidant by pressurizing ambient air. Hydrogen fuel is provided from a fuel supply subsystem that comprises fuel feedstock 6 (e.g. diesel fuel, gasoline), RVPSR 7, water gas shift reactor 8, heat exchanger 9, and rapid cycle pressure swing adsorption device (RCPSA) 11.

As shown, fuel feedstock 6 and liquid water 12 are provided to RVPSR 7 and are reacted therein to produce syngas comprising hydrogen, carbon dioxide, carbon monoxide, and steam. The syngas may then be directed to water gas shift reactor 8 in which carbon monoxide and water are further reacted to produce additional hydrogen and carbon dioxide. The fuel stream is cooled using heat exchanger 9, water is knocked out at exhaust 13 (optionally recycled back to the RVPSR) and remaining hydrogen-rich syngas stream is fed to RCPSA 11 to separate hydrogen from the carbon monoxide and carbon dioxide. (RCPSA 11 may be expected to output 95+% hydrogen with less than 50 ppm CO impurity and with greater than or about 80% yield from an original feed comprising as much as 10% CO.)

Exhaust 14 from RCPSA 11 (containing hydrogen, carbon monoxide, and carbon dioxide) and oxidant exhaust 15 (containing oxygen) from fuel cell stack 2 are both suitable for regeneration in the pressure swing reforming process and are thus directed through RVPSR 7 as shown. Anode exhaust 16 from stack 2 may be recycled or diluted and then exhausted in a conventional manner. Waste gas following regeneration is exhausted from RVPSR 7 at flue gas exhaust 17.

Multi-Bed Rotary Valve Pressure Swing Reformer

Figure 2A:
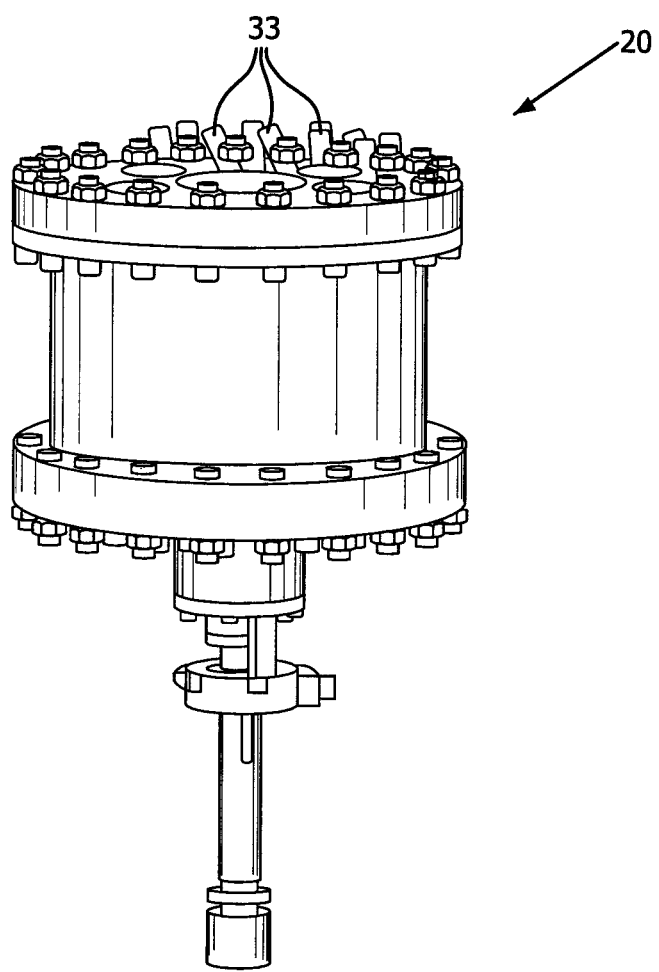
FIGS. 2a and 2b depict a side view and an exploded view respectively of an exemplary RVPSR suitable for use in the system of FIG. 1.
Figure 2B:
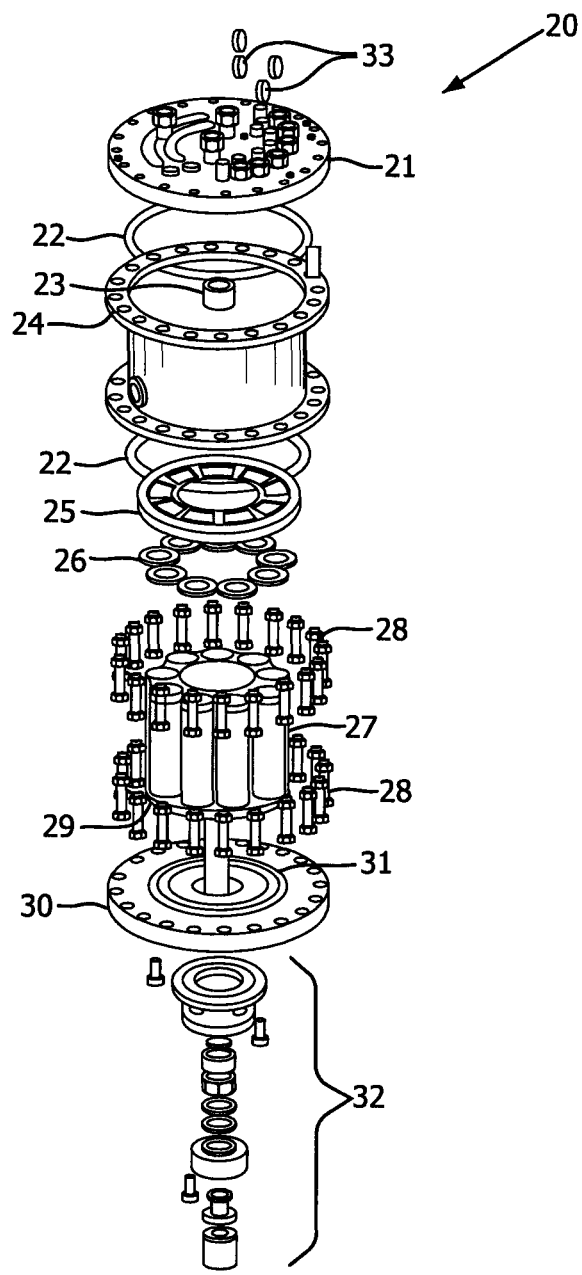

An exemplary embodiment of a multiple bed RVPSR suitable for use in the system of FIG. 1 is depicted in FIGS. 2a and 2b, which show a side view and an exploded view of exemplary RVPSR 20 respectively.

RVPSR 20 comprises feed stator 21, feed and product stator E seals 22, bushing 23, stainless steel casing 24, high temperature feed stator seal 25, bed E seals 26 (feed end seals for the beds are shown but product end seals not shown in FIG. 2), reformer cartridge bed assembly 27, fasteners 28, high temperature product stator seal 29, product stator 30, drive shaft 31, bearing/drive assembly 32, and direct liquid injectors 33.

Drive shaft 31 is located at its upper end in bushing 23 (Lubron) and is driven by bearing/drive assembly 32. Drive shaft 31 rotates the entire unit comprising cartridge bed assembly 27 and feed and product stator seals 25, 29 inclusive in a clockwise direction when looking down onto feed stator 21.

Figure 2C:
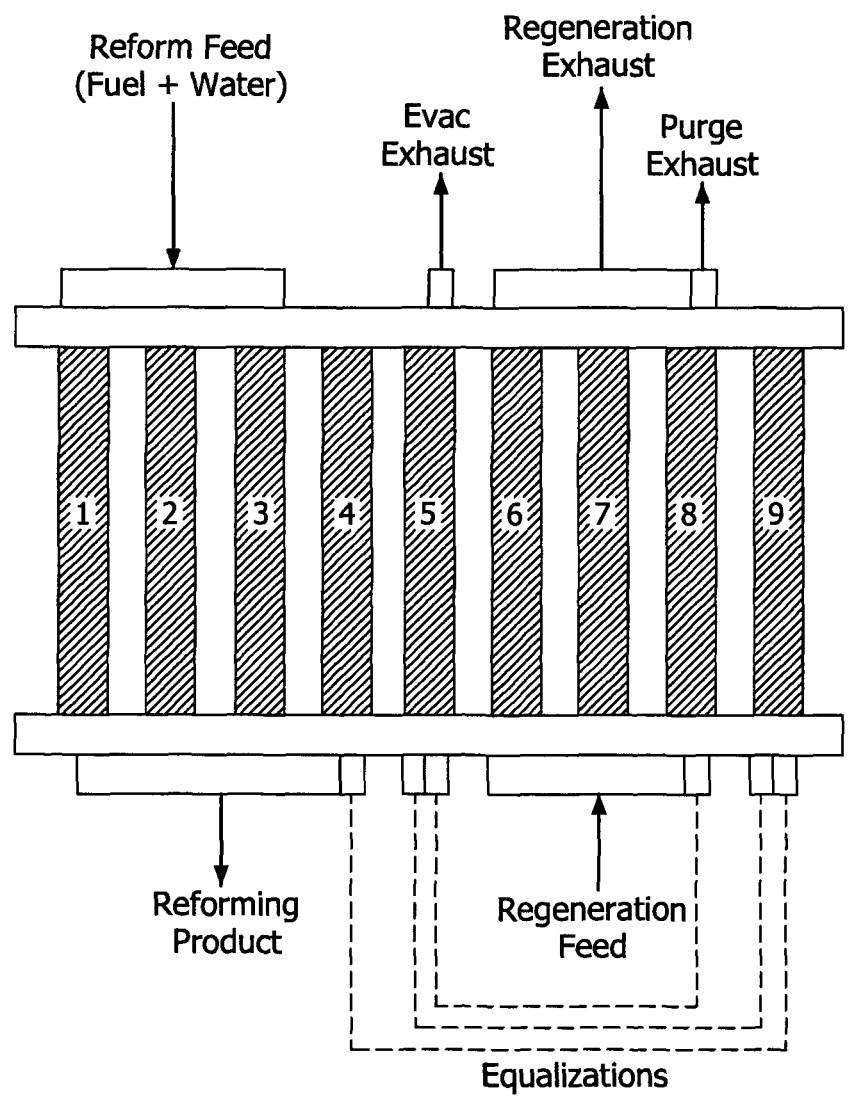
FIG. 2c shows a schematic of the inlets, outlets, and interconnections of the RVPSR of FIG. 2a with the reformer beds "unrolled".
Figure 3A:
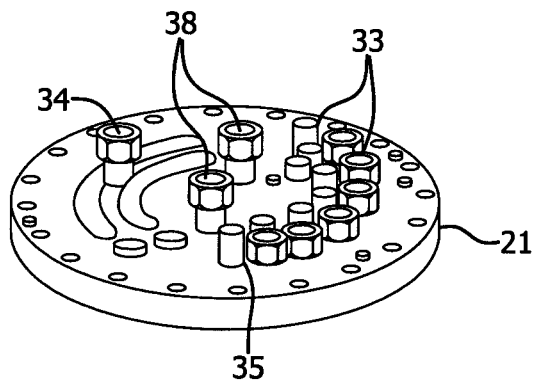
FIGS. 3a and 3b show an oblique top and bottom view respectively of the feed stator of the RVPSR in FIG. 2.
Figure 3B:
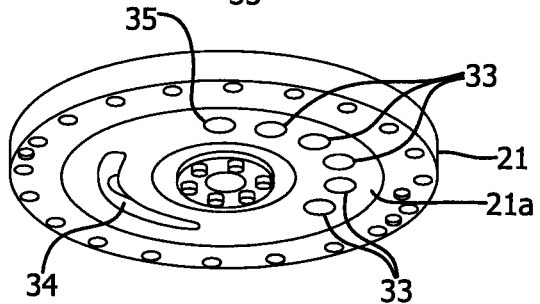
Figure 4A:
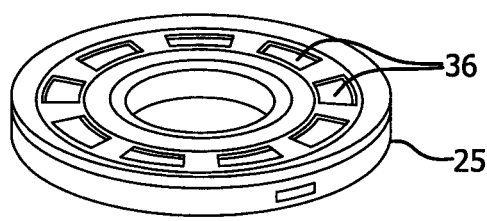
FIGS. 4a and 4b show an oblique top and bottom view respectively of the graphite feed stator seal of the RVPSR in FIG. 2.
Figure 4B:
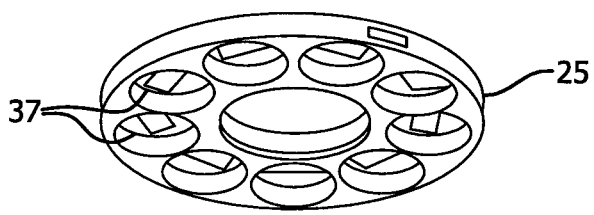

Feed stator 21 is shown in more detail in the oblique top and bottom views of FIGS. 3a and 3b respectively. FIGS. 4a and 4b show an oblique top and bottom view respectively of graphite feed stator seal 25 in FIG. 2. Feed stator 21 and stator seal 25 act as a high temperature gas/liquid rotary valve to open and close the nine reformer beds within cartridge bed assembly 27 at their feed ends. In a like manner, product stator 30 and product stator seal 29 act as a high temperature rotary valve to open and close the nine reformer beds within cartridge bed assembly 27 at their product ends. FIGS. 6a and 6b show product stator seal 29 in more detail in oblique top and bottom views respectively. And, FIGS. 7a and 7b show product stator 30 in more detail in oblique top and bottom views respectively.

Design of Multiple Beds

We have discovered that the operational efficiency of a pressure swing reformer can be substantially increased by conducting the pressure swing reforming in a reactor containing multiple parallel beds that allow for multiple intermediate equalizations of pressure between the high pressure reforming step and low pressure regeneration step. Such an arrangement can ensure a smooth transition from reforming to regeneration with either minimal loss of syngas product or minimal use of an external purge stream during transition or both. In a preferred multi-bed PSR reactor embodiment, gases will enter and/or leave each bed at various intermediate pressures as well as highest and lowest pressure levels through a pair of valves (one valve at each end of these reformer beds). Each valve will have multiple ports (all in one plane) and provide the valve function for a common end of all the beds in the PSR. Reformer beds and the ports on the two valves are engaged and disengaged via relative rotating motion between the beds and valves. The pair of valves are hence rotary valves and the reactor is a rotary valve pressure swing reformer or RVPSR.

Operating a PSR reactor with multiple beds configured for pressure equalization would allow the following enhancements and benefits:

1) Continuous generation of syngas by eliminating "dead times" between the end of the high pressure reforming step and the beginning of low pressure regeneration step during which no synthesis gas is produced.
2) Reduce or eliminate use of high pressure steam for syngas purge at the end of reforming step. High pressure steam may be added at the end of the reforming step ("steam push") to increase system efficiency by pushing (like a piston) some or all of the syngas remaining in the bed into the product stream prior to depressurizing (exhausting) the bed for regeneration. Using a multiple bed reactor allows pressurized syngas from the end of a reforming step to be emptied into another bed which is about to enter the reforming step, thus preserving syngas. This is accomplished via one or more pressure balancing steps in which one bed that is being depressurized in preparation for regeneration is physically connected to another bed which needs to be pressurized prior to beginning reforming.
3) Increase reformer efficiency as less heat is required to raise the excess steam for high pressure syngas purge.
4) Decrease the reactor water feed requirement by reducing or eliminating the steam purge. In reactor systems which must recover and recycle water, this enhancement reduces the water recovery requirement.
5) Operate PSR reactor with shorter cycles (relative to full use of bed heat capacity). As cycle time is reduced, the syngas remaining in the reformer beds after the reforming step becomes a greater fraction of the total syngas production rate. Efficiency maintenance necessitates the recovery of this residual syngas. Use of steam purge (or "steam push") for this purpose will tend to decrease system efficiency and increase water demand as cycle time decreases. The pressure balances allowed by use of multiple beds can be used to minimize the need for steam purge as cycle time is reduced.
6) Operate PSR reactor with reduced temperature swing, as a result of operating with shorter cycle times, thereby reducing thermal stress on the reactor internals.
7) Achieve 99+% cycle average reforming conversions by operating the reforming reaction at a higher average and peak catalyst temperature, which is achieved by operating at a shorter cycle time. It is especially desirable to keep the peak bed temperature from falling below 1,000.degree. C. which can result in the formation of significant C2+ hydrocarbons.
8) Achieve higher conversions while reforming higher boiling and higher sulfur containing hydrocarbon feeds due to shorter cycles and higher peak and average catalyst temperatures, which act to "cleanse" deposited soot and/or adsorbed sulfur through oxidation at a higher frequency, and promote the conversion of C2+ hydrocarbons.

Using rotary valves in the design of such multiple bed PSRs would allow the following enhancements and benefits:
1) Reduced overall reactor size by minimizing the number of valves and associated piping and header volumes.
2) Enhanced ease of control as there is only one actuating mechanism (relative rotating motion between the valves and the reformer beds) to control all the flows.

An aspect of the present invention then is to provide means for transitioning the PSR bed from one stage to another, i.e. from reforming to regeneration or vice-versa, via one or more pressurization and/or de-pressurization steps. The steps consist of specific valve timings and flow connections. In the simplest embodiment, one pressurization step is employed (after the end of the regeneration cycle) which consists of starting the reforming feed while keeping the syngas outlet valve closed. After a specified amount of time, a pressurization step time, the syngas outlet valve is opened and syngas removal from the reactor is begun (the reforming step begins). Conversely, at the end of the reforming step (after both reform inlet and syngas outlet valves are closed), the regeneration outlet valve would be opened to allow the contents of the reactor to flow out through the regeneration exhaust. After a specified amount of time, a de-pressurization time, the regeneration feed valve is opened and the regeneration step commences. In this simplest embodiment, pressurization is accomplished with reform feed, and de-pressurization is directed to the regeneration exhaust.

Preferably, steam is introduced at the end of the reforming step while the syngas outlet valve is still opened. The steam displaces the syngas remaining in the reactor into the syngas product stream (referred to as "steam push"), which improves the efficiency of the process. After a specified amount of time, the purge time, the regeneration outlet valve would be opened to allow the contents of the reactor to flow out through the regeneration exhaust.

For improved reformer efficiency, one or more equalization steps are employed as part of the pressurization and de-pressurization stage. Herein, an equalization step is defined as a step that (1) extracts gas from the PSR reactor, after the reforming step, at a pressure intermediate between reforming and regeneration, and (2) inserts that gas into the reactor after the regeneration step to re-pressurize the reactor. In a preferred embodiment, two or more equalization steps are employed in between reforming and regeneration. In the case where more than one equalization step is employed, the first extraction step will yield the highest pressure gas, and the subsequent steps will yield lower pressure gas. Thus, the order in which these gases is used is reversed during the insertion steps, with the lowest pressure gas (the one extracted last) being the first gas used for re-pressurization of the reactor.

In a preferred embodiment with multiple equalization steps, a multi-bed cycle is employed such that equalization always occurs by means of direct insertion into a re-pressurizing bed with gas that is being simultaneously extracted from a de-pressurizing bed. Such a multi-bed cycle is created by having many different reactor beds in the PSR system, each of which is in a different phase of the cycle. Multiple valves or multi-port valves are used on each reactor bed to direct inlet and outlet flows among the various step conditions, including regeneration inlet and outlet, reform inlet and outlet, and the equalization inlets and outlets. Each reactor bed allows flow of materials either from top to bottom or from bottom to top. The material leaving the bed from either end is directed either out of the PSR system or to another bed. In one multi-port valve embodiment, a separate multi-port valve is used at each end of each reactor bed to direct the flow of material into or out of that end of the reactor bed. In a preferred multi-port valve embodiment, all reactor beds share two multi-port valves, with each valve performing all the flow switching for the common ends of the reactor beds. The reactor beds periodically engage with and disengage from the two multi-port valves due to a relative motion between the reactor beds and valves. In the case of multiple valves, each reactor bed is associated with a set of valves that direct the flow in or out of that reactor bed.

In a more preferred embodiment, the valves are executed as a rotating multi-port valve system. Relative movement is caused by either the beds rotating past the fixed valves or the valves rotating past the fixed beds. FIGS. 2-7 show an exemplary RVPSR system 20 with nine reactor beds and two multi-port rotary valves at either end. Relative rotating movement between the two valves and individual beds allows each bed to "engage" different ports on these two valves at various times during operation. Relative rotating movement can be achieved either by rotating the valves while keeping the beds stationary (rotating valves) or, as depicted in the embodiment of FIGS. 2-7, by rotating the beds while keeping the valves stationary (rotating beds).

An example of an operating cycle (defined as a collection of distinct operating steps that periodically repeat) for this RVPSR is illustrated in FIGS. 2c and 2d. The former shows a schematic of the physical arrangement and the latter shows details of the operation. Depending on specific desired outcomes and constraints from other accompanying processes, if any, the cycle can be changed and/or modified to include additional steps, delete steps, modify execution of steps, or change the order of execution of steps, or any combination of above mentioned changes.

FIG. 2c shows the "unrolled" collection of reformer reactor beds of the RVPSR of FIG. 2a (i.e. beds are "unrolled" about the rotary axis of RVPSR 20). The inlets, outlets, and exemplary interconnections between the reformer beds for equalization and operation are also shown schematically. In the representation of FIG. 2c, rotation of the beds moves each bed (with the exception of the right most bed 9), in the direction from left to right. The right most reactor bed 9 however moves to assume the position of left most reactor bed 1. If the reactor beds are placed in a symmetrical manner in a circle, then each bed moves an angular distance of 360.degree./N between positions, where N=# of reactor beds, in this case nine. Note that interconnections are provided so as to allow interconnection between several beds at their top ends (between beds 1-3 and 6-8) and at their bottom ends (between beds 1-4 and 6-8). Also interconnections (depicted by dashed lines) are provided so as to allow certain pairs of beds to be interconnected at their bottom ends (e.g. between beds 4 and 9, 5 and 9, and 5 and 8).

The cycle executed by the 9-bed RVPSR reactor of FIG. 2c includes several steps such as: "pressurization" of reforming beds with reforming fuel and water entering the bed from the top and no product exiting from the reactor bed being pressurized; "reforming" operation with reforming product syngas exiting the reactor bed(s) from the bottom and reforming fuel and water entering the reactor bed(s) from the top; multiple "pressure equalization" steps involving pairs of reactor beds with flow from the reactor bed at higher pressure directed to the reactor bed at lower pressure; evacuation step that involves allowing all the remaining reforming step product from the reactor bed to escape before beginning the regeneration step; regeneration step with regeneration fuel and oxidant enter the reactor bed(s) from the bottom and regeneration product (exhaust flue gas) exiting the reactor bed(s) from the top; and a regeneration "purge" step that removes products from the regeneration step by displacing it with reforming product from one of the beds that is about to commence regeneration. The movement of gases from one reactor bed to another reactor bed can be accomplished by letting the reactor beds communicate either from the top only or from the bottom only or from top of one reactor to the bottom of another reactor. For the sake of simplicity, FIG. 2c shows bottom-to-bottom communication between reactors only. The choice of how to implement the reactor bed communication scheme depends on the quality of syngas left in the reactor bed following the reforming step. If the quality of syngas in the reactor bed is fairly homogeneous along the length of the reactor bed, then the reactor bed communication scheme is implemented based on the relative ease of mechanization. However, if the syngas quality varies with the length of reactor bed, then the bed communication scheme is preferably implemented in a manner that returns the poorest quality syngas from a donor reactor bed into the reforming inlet of the accepting reactor bed. In this manner, poor quality syngas will pass through the whole catalytic part of the accepting reactor bed before eventually exiting that reactor bed as product syngas. In the preceding text, quality of syngas is quantitatively defined as $$\text{Quality of Syngas} = 1 - (\text{amount of C2+hydrocarbons})/(\text{total amount of syngas in the reactor bed at any given location})$$

The conceptual cycle executed by the PSR in FIG. 2c is shown in a different and more detailed form in FIG. 2d. All the reactor beds in the multi-bed PSR reactor undergo an identical cycle, however, the cycles in consecutive beds are displaced by a constant time period. The reforming step is performed at a higher pressure of 15 bar and regeneration step is performed at a lower pressure of 1.2 bar. Several other steps are performed at intermediate pressures between 15 and 1.2 bar.

Bed 1 in FIG. 2c (at step 10 in FIG. 2d), is under the "pressurization step" and has the top port open to receive the reforming feeds (fuel and water), however the bottom port is closed. The temperature in bed 1 is sufficiently high to ensure reforming and generation of syngas thereby increasing the pressure inside the reactor bed. FIG. 2d shows that the pressure during this pressurization step increases from 10.4 to 15 bar. The time for pressurization is less than or equal to the time required to traverse an arc length inscribed by an angle of 20.degree. (=360.degree./9*0.5) and a given PSR reactor radius (measured from the center of the reactor beds to the rotational axis) at a given rotational speed. Following pressurization, the bottom port is opened to allow exhaust of syngas while maintaining flow of the reforming feeds at the top inlet ports. This is called the reforming step, and as shown in FIGS. 2c and 2d, beds 1 through 3 are in the reforming step of the cycle. It is important to note that at any given instance during the operation of this 9-bed PSR reactor, at least 3 reactor beds are reforming hydrocarbon fuel thereby ensuring a continuous supply of syngas. (With regards to FIG. 2b, in the reforming step, the individual beds in cartridge bed assembly 27 rotate so as to successively align with 5 sets of liquid fuel and liquid water direct injectors (collectively 33). The liquid water is converted to steam within the reformer bed via contact with a vaporizer element incorporated in the top of the individual beds. The steam/fuel vapour mixture then is funneled in towards reforming catalyst located in the bed underneath the vaporizer. In this design, the vaporizer diameter is greater than the diameter of the reforming catalyst bed.

At the end of the reforming step, reactor beds undergo a series of pressure equalization steps to remove high pressure syngas from the bed in a step-wise manner and eventually lower the pressure in the bed to 1.2 bar prior to performing the regeneration step. Such removal of syngas ensures that the reactor bed internals (such as catalyst, mixers and other hardware) are not subjected to sudden and drastic pressure changes. The first equalization step (step 2 in FIG. 2d) removes a portion of synthesis gas from the reactor (donor bed) that has just finished reforming, thereby lowering its pressure from 15 bar to 10.4 bar. The syngas removed is passed to another reactor (recipient bed) that is being readied for the pressurization step, thereby increasing its pressure from 5.8 to 10.4 bar. Those skilled in the art of gas flow control and manipulation would recognize that there will be a slight pressure drop associated with the movement of the gas from one reactor bed to another. For the sake of discussion here, this pressure drop has been ignored, but could easily be included without affecting the execution of any individual step in the cycle or of the cycle as a whole. In FIGS. 2c and 2d, bed 4 is undergoing Equalization 1 (steps 2 and 9 in FIG. 2d) with bed 9 undergoing transport of syngas from reactor 4 to reactor 9. Following Equalization 1, the beds undergo a second equalization step. Equalization 2 (steps 3 and 8 in FIG. 2d) lowers the pressure in the donor bed (bed 5 in this case) from 10.4 to 5.8 bar, while it simultaneously increases the pressure in the recipient bed (bed 9 in this case) from 1.2 to 5.8 bar. In the present example, the order of physical connection to beds being readied for reforming is first to bed 5 and then to bed 4.

As previously mentioned, movement of the gas from one bed to another is accomplished by simultaneously opening at least one port of each of these reactor beds to at least one conduit that connects at least one port from each of these reactor beds. Also, none of the ports of either of the reactor beds involved in an equalization step communicates to the ambient. In FIG. 2c, these conduits are shown by "dashed" lines. The time required to execute each equalization step is finite (>0 sec) but less than or equal to the time required to traverse an arc length inscribed by an angle of 20.degree. (=360.degree./9*0.5) and a given PSR reactor radius (measured from the center of the reactor beds to the rotational axis) at a given rotational speed.

Again with reference to FIGS. 2c and 2d, at the end of Equalization 2, a fraction of the original amount of syngas still resides in the bed at a pressure of 5.8 bar, and prior to the regeneration step this pressure must be reduced to 1.2 bar. This can be accomplished by partially removing the syngas from the reactor bed to displace exhaust gases left in another reactor bed that has just completed the regeneration step. This step is referred to as a purge (in FIG. 2d, this is steps 4 and 7). In FIGS. 2c and 2d, reactor beds 5 and 8 are undergoing the purge step. Bed 5 is the donor bed and bed 8 is the recipient bed. The purge step is different from equalization step since the recipient bed in the purge step has at least one of its ports in communication with ambient. Consequently, at the end of this step the recipient bed is essentially at the same pressure as at the beginning of the step and the donor bed is at a pressure intermediate between 5.8 and 1.2 bar (3.5 bar in this example). In the limiting case, the final pressure of the donor bed could be as low as the regeneration pressure of 1.2 bar. The final donor bed pressure is determined by the duration and nature of communication between the recipient bed and donor bed. As seen from FIGS. 2c and 2d, recipient bed 8 has the top exhaust port in communication with ambient and remains at 1.2 bar throughout this step, and donor bed 5 starts at 5.8 bar and ends up at 3.5 bar.

Following the purge step, bed 5 (at 3.5 bar) can be evacuated to lower its pressure to 1.2 bar either by opening at least one of its ports to the ambient or by using another gas stream to purge the bed (called external purge) or by a combination of both of these options. In FIGS. 2c and 2d, bed 5 is undergoing evacuation by simply releasing its contents to ambient. Once the reactor pressure is at 1.2 bar, the regeneration step may begin. Regeneration feed is introduced from the bottom of the bed and regeneration exhaust is released from the top. Beds 6 thru 8 are undergoing regeneration. At any given instance during operation of the PSR reactor, approximately 3 reactor beds are undergoing regeneration. Immediately following regeneration, a reactor bed is ready to be a recipient bed for purge step and other equalization steps to raise its pressure to 10.4 bar. Then the cycle repeats beginning with the pressurization step.

During transition from reforming to regeneration some amount of gas needs to be purged. For a Wise case, two-bed PSR system, the amount of gas purged is equal to the amount of gas left following reforming. As described in previous PSR patent applications, a general object is to have high utilization of the bed heat capacity, or high amounts of per cycle reforming. In the aforementioned US 2003/0235529, we defined (cycle time*GHSV) (GHSV=Gas Hourly Space Velocity) as the "standard volume turnover ratio" (SVTR), and indicate a preference for this value to be greater than 5, more preferably greater than 10, and most preferably greater than 20.

In a multi-bed PSR system operating with a multi-step cycle, the amount of gas purged from the system between regeneration and reforming is only a fraction, f, of amount of gas left after reforming. For a cycle with "n" number of equalization steps, operating with reforming at $P_{REF}$ and regeneration at $P_{REG}$ ($P_{REF} > P_{REG}$), f is given as:

f=P REF+n.times. P REG (n+1).times. P REF if no purge steps f=P REF−P REG (n+1).times. P REF if a purge step is included (with n.ltoreq. P REF/P REG)##EQU00001##

Thus by using an advanced, multi-bed cycle, a (1−f) fraction of the material that remains in the reactor bed following reforming is recovered by being replaced into other beds prior to beginning of the reforming step for those other beds. Thus, in comparison to a base two-bed PSR, the present invention can be operated with a level of purge medium that is only f times that of the base PSR. Alternatively, at a fixed level purge medium, a PSR of the present invention can achieve similar performance and still allow a (1/f) increase in bed dead volume, or a (1/f) decrease in SVTR, or some combination of these. In the present 9-bed example of FIGS. 2a-d, $P_{REF}$=15 bar, $P_{REG}$=1.2 bar, n=2, and there is a purge step; therefore, f=0.31. When compared to a conventional PSR with no equalizations or purge operating at an SVTR=20; the current 9-bed example may run at an SVTR of 0.31*20=6.2 and achieve the equivalent performance of syngas which is purged from the system. Although it takes greater system complexity to achieve this result, it allows the system to benefit from the advantages of shorter cycle time described previously.

High Temperature Rotary Valve Design

The stator and seal assemblies shown in FIGS. 2-7 serve as high temperature rotary valves that can handle fluid temperatures up to about 400.degree. C. and fluid pressures up to about 250 psig. The timing of hot fluid flow is managed from a single source to one or more destinations or vice versa with low internal and external leakage. Timing is generally determined by the angular location of liquid direct injectors and/or the location and shape of ports in the stators and corresponding stator seals. For instance, when the ports of a rotating stator seal align with a port on the stationary stator, fluid can flow through both components. When the ports do not align, fluid flow is shutoff.

The high temperature rotary valve employs a pressure balanced construction analogous to those described for the rotary valves in, for instance, U.S. Pat. No. 6,063,161. The rotating stator seal is designed such that it is forced against the surface of the stator counter surface to form a seal by the fluid pressure. The geometry of the rotating seal is such that a larger force from the fluid pressure is exerted on the seal in the direction of the stator as compared to the force generated by the seal pressure at the dynamic sealing interface, thus forming a face seal.

High temperature functionality of the depicted rotary valves is achieved by using suitably stiff, temperature tolerant, and corrosion resistant stator seals and stators in which the countersurface of the stators is suitably wear resistant. The rotary valves in FIG. 2 employ one-piece seals with appropriate stiffness characteristics to handle the pressure experienced (unlike two piece seals, a single piece seal has manageable and predictable behavior with increased temperature). Adequate flatness of the contact surfaces is maintained between stator seal and stator by selecting materials with appropriate stiffness characteristics and by making the components in a suitable thickness for the application. For instance, stator seals may be made of carbon-graphite (such as EK-20, a product of SGL), antimony-filled graphite (such as EK-34, another SOL product) or silicon carbide. (These materials are suitable choices with respect to thermal shock and thermal accelerated oxidation, and also provide low friction when rubbing against a counter-surface. In the case of carbon-graphite, material with a higher graphite content is typically selected to better handle thermal shock and oxidation.) The stators may be made of a conventional grade of stainless steel (e.g. 316SS) but a hard coating is employed to the sealing surface (e.g. tungsten carbide cobalt—15% Co). To determine an appropriate component thickness for a given application, finite element analysis may be employed.

The high temperature rotary valve design employed in FIG. 2 allows for very fast switching and obviates the requirement to cool the various fluids before they pass through the valves. Further, the durability of the face seals employed is better than other types of switching valves, such as solenoids.

Feed Stator and Seal

A more detailed view of feed stator 21 is shown in FIGS. 3a & 3b (top and bottom view respectively). And, a more detailed view of feed stator seal 25 is shown in FIGS. 4a & 4b (top and bottom view respectively). Feed stator 21 has a hard tungsten carbide cobalt—15% Co coating 21a applied at the sealing surface. In this exemplary embodiment, stator 21 is made of 316SS and is approximately 19" in diameter. To maintain satisfactory flatness of the contact surface for sealing purposes under the load and temperatures experienced, the stator is approximately 2" thick (FEA analysis was used to determine expected deformation). Graphite seal 25 is about 14" in diameter and about 1.3" thick.

Angled feedthroughs are machined into stator 21 for the 5 sets of liquid fuel and water direct injectors 33. In a like manner, a feedthrough is provided for the single liquid water direct injector 35 for the steam push stage.

Angled feedthroughs are machined into stator 21 for the 5 sets of liquid fuel and water direct injectors 33. In a like manner, a feedthrough is provided for the single liquid water direct injector 35 for the steam push stage.

Direct injectors 33 are precisely controlled to spray liquid fuel and water as the beds rotate underneath. The multiple sets of injectors are required to provide adequate time to admit fuel during the reforming stage. In the arrangement shown, since the reformer beds pass under stationary injectors, the spray pattern onto the beds is not continuous and does not cover the entire bed. Also, multiple automotive fuel injectors may be considered to be relatively costly for a fuel cell vehicle application. And, a sophisticated electrical system is needed to drive and control the automotive direct injectors. Thus, alternatives such as those discussed later with respect to FIGS. 8 and 9 may be considered instead.

In RVPSR 20, hot flue gases that are exhausted during regeneration of the reformer beds pass through port 34 in feed stator 21. The local heating of stator 21 from these flue gases could result in an unacceptable warping and could also result in overheating of nearby direct injectors 33. Thus, at least a local cooling in the vicinity of port 34 of feed stator 21 is desired. In the depicted embodiment, local liquid cooling passages are provided in stator 21 around flue gas exhaust port 34 and externally supplied water cooling is provided at inlet/exhaust ports 38. Alternatively, other relatively cool process fluids might be directed through the stator cooling passages instead, thereby eliminating the need for an external cooling source. Or, the geometry of the rotary valve may be modified (e.g. addition of fins, etc.) such that heat is dissipated into the atmosphere via forced air cooling.

Cartridge Bed Assembly

Figure 5A:
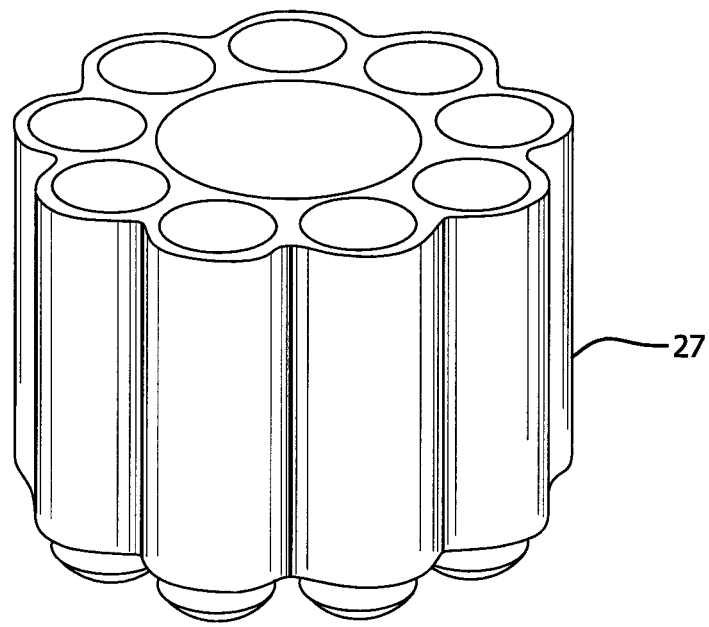
FIGS. 5a and 5b show an oblique top and bottom view respectively of the cartridge bed assembly of the RVPSR in FIG. 2.
Figure 5B:
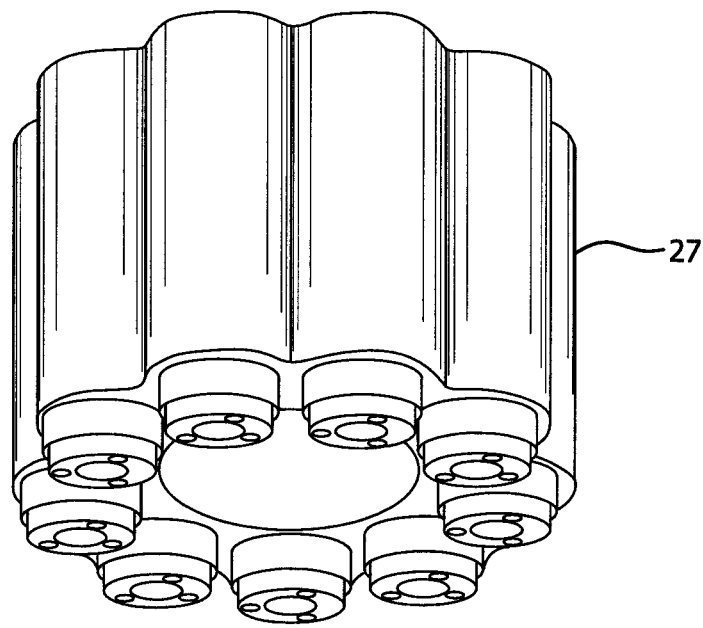

FIGS. 5a and 5b show an oblique top and bottom view respectively of the cartridge bed assembly of RVPSR 20 in FIG. 2. Overall, the diameter of assembly 27 is approximately 14" and it is made of 316SS with hard chrome plate applied to the surfaces contacting upper 26 and lower E seals (lower E seals not shown in FIG. 2). The 9 individual beds in cartridge bed assembly 27 are about 3" in diameter (catalyst bed is about 1.25" in diameter with balance of diameter being insulation). The general design of the individual beds is disclosed in the aforementioned background art on PSRs. Herein, the beds include vaporizer units at the feed entrances to vaporize injected liquid water immediately upon entry. A unitary cartridge assembly for the multiple reformer beds is preferred over individual beds since it ensures that alignment from bed to bed is maintained (e.g. no vertical displacement nor tilt can occur between beds). Also, it is easier to machine a single flat sealing surface for E seals 26.

Sealing the ends of the reformer beds in cartridge bed assembly 27 to stator seals 25 and 29 is challenging in that several difficult requirements must be met with one type of seal. In this exemplary embodiment, cartridge bed assembly 27 nests into ports 36 on the underside of feed stator seal 25 and each bed in the cartridge assembly seals to shoulders 37 using an E seal 26. In a like manner, each bed also seals, using E seals, against similar shoulders in ports 45 on product seal 29 in FIG. 6a.

JWI type E seals 26 (from Jetseal Inc. Spokane, Wash.) are special seals suitable for use in this situation. They can provide a suitable fluid seal in the high temperature, corrosive environment within RVPSR 20, while allowing for movement of the bed with respect to feed and product seals 25, 29, Note that significant movement of the beds can arise from excursions due to thermal expansion, wear, and other dynamic processes taking place within the beds. The E seal acts likes a seal plus a spring in one. The E seal is shaped in cross-section like the letter "E" and thus has substantial compliance to act as a spring. E seals are made of appropriate metals and/or alloys for corrosion and temperature resistance and may have platings or coatings at the sealing surfaces for purposes of affecting a seal. The E seals are oriented such that the open-side of the "E" faces the higher pressure side of the seal. This helps to force the sealing surfaces together.

Product Stator and Seal

FIGS. 6a and 6b show more detailed top and bottom views respectively of product stator seal 29 of RVPSR 20. And, FIGS. 7a and 7b show more detailed top and bottom views respectively of the product stator 30. Generally the construction of these components is similar to that of feed stator 21 and feed stator seal 25 (e.g. similar materials, similar hard coating 30a as 21a) although product stator seal 29 is thicker (about 13/4" thick) in order to accommodate the shaped end of assembly 27.

Product stator 30 however has a port configuration appropriate for the product end of RVPSR 20. Product port 40 is for outputting product syngas generated within the reformer beds. Equalization ports 41 and 42 allow the appropriate beds to be interconnected externally for purposes of equalization. Ports 41 are for connecting to the beds after the high pressure reforming stage while ports 42 are for connecting to the beds after the low pressure regeneration stage. Finally, regeneration gas ports 43 and 44 are for connecting to regeneration fuel (i.e. RCPSA exhaust 14 in FIG. 1) and regeneration oxidant (i.e. fuel cell oxidant exhaust 15 in FIG. 1) supplies respectively.

Alternatives for Introducing Reactants

Figure 8A:
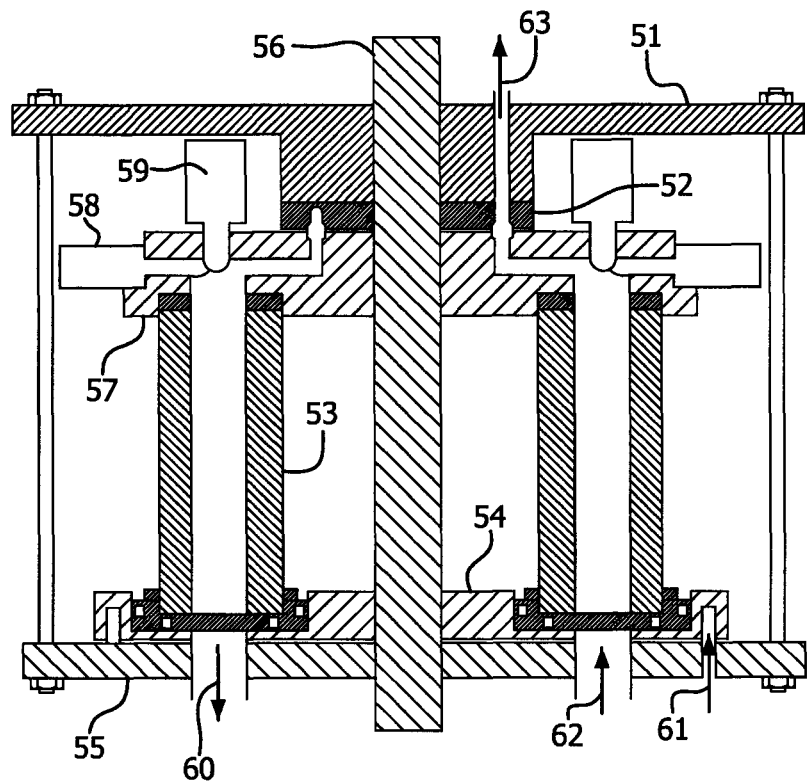
FIGS. 8a and 8b show cross-sectional diagrams of alternative RVPSR embodiments that employ automotive-type direct injectors to introduce the reactants. The injectors rotate in the former and are stationary in the latter.
Figure 8B:
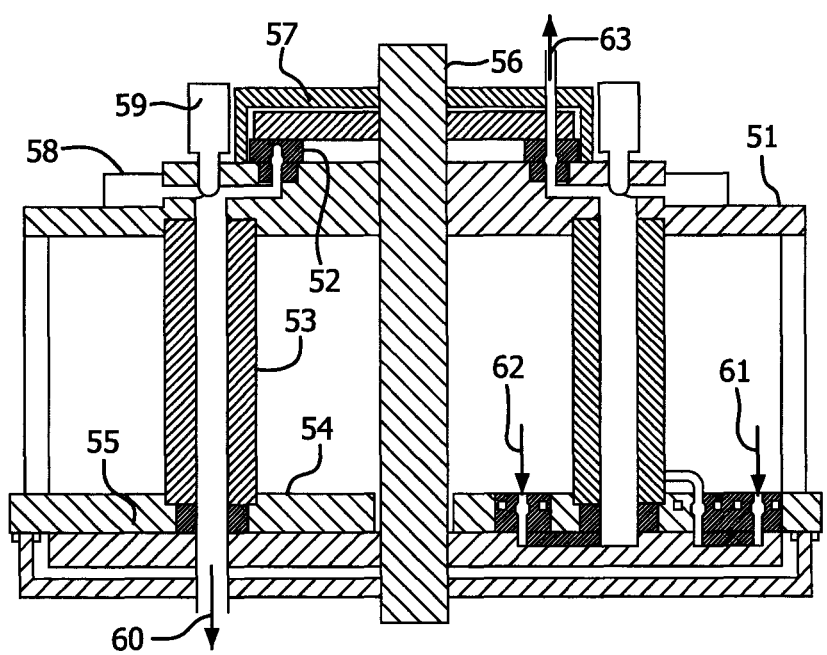
Figure 9:
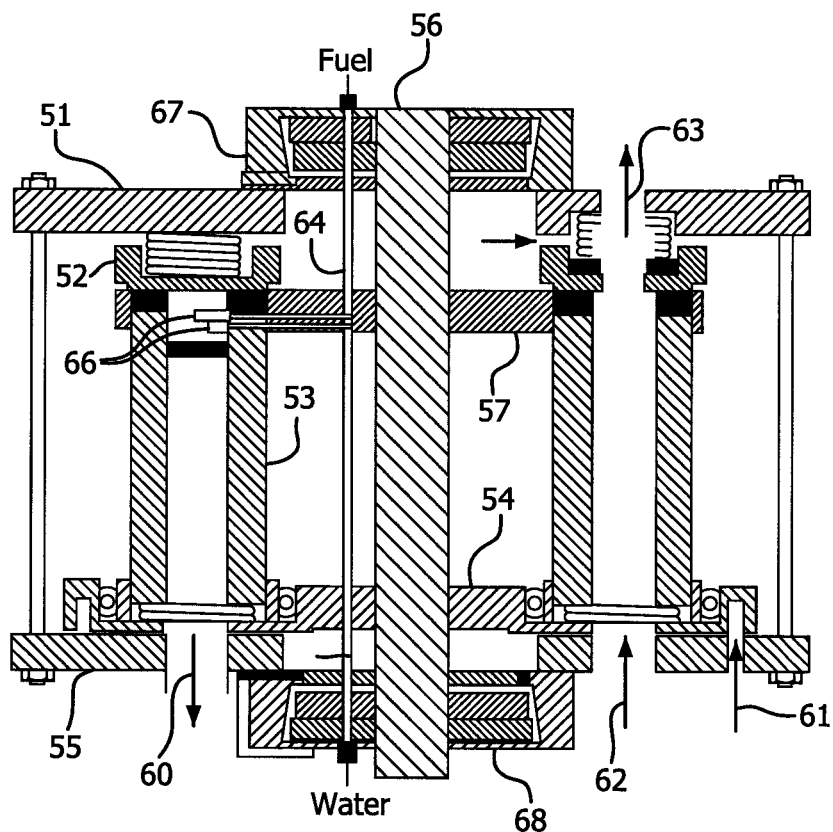
FIG. 9 shows a cross sectional diagram of an alternative RVPSR embodiment that employs a rotating valve assembly instead of automotive-type direct injectors to introduce the reactants.

One possible configuration of automotive type direct injectors used to introduce reactants into the reformer beds in the exemplary RVPSR 20 is shown in FIGS. 2-7. However, other configurations are possible. For instance, FIGS. 8a and 8b show cross-sectional diagrams of alternative configurations of automotive-type direct injectors to introduce the reactants. In FIG. 8a, the injectors rotate along with the reformer beds. In FIG. 8b, an alternative arrangement is depicted in which the injectors and beds are stationary but the valves rotate. FIG. 9 on the other hand shows a cross sectional diagram of a preferred alternative RVPSR embodiment that employs a rotating valve assembly instead of automotive type direct injectors to introduce the reactants.

As in the exemplary embodiment of FIGS. 2-7, the RVPSRs in FIGS. 8a, 8b, and 9 have the following components in common: feed stator 51, feed stator seal 52, reformer beds 53, product stator seal 54, product stator 55, rotary drive shaft 56, feed rotor 57, fuel injector 58, and water injector 59. The entire assembly in FIGS. 8a and 9 between and including feed stator seal 52 and product stator seal 54 rotates. In FIG. 8b, it is product and feed rotors 55, 57 that rotate. The RVPSRs in these figures are all at a common stage in the PSR cycle in which syngas is shown exiting at port 60, regeneration "fuel" gas (from RCPSA 11 in FIG. 1) is shown entering at port 61, and regeneration "oxidant" gas (from fuel cell stack 2 in FIG. 1) is shown entering at port 62. Flue gas exhaust is shown exiting the regenerated bed at port 63.

The embodiment in FIG. 8a differs from that in FIG. 2 in that the direct injectors rotate with the rotating reformer beds. As such, the direct injectors and reformer beds are fixed relative to each other and thus, desirably, so is the spray pattern of the injected liquids. Liquid and electrical connections to the direct injectors are made via conventional fluid slip rings and electrical slip rings respectively (not shown). However, as in the design shown in FIG. 2, the flow of gaseous streams such as syngas product for reforming step, feed stream for regeneration step, and exhaust product of regeneration step, do still communicate via multi-port valves. These valves maintain rotary motion with respect to the reactor beds. Benefits of this design include decreased complexity required at the reformer bed inlets and a possible reduction in size of the internal vaporizers.

The embodiment in FIG. 8b differs from that in FIG. 2 in that both the direct injectors and the reformer beds are stationary, and it is the rotary valves that rotate. However, as in the design shown in FIG. 2, the flow of gaseous streams such as syngas product for reforming step, feed stream for regeneration step, and exhaust product of regeneration step, do still communicate via multi-port valves. These valves maintain rotary motion with respect to the reactor beds. A benefit of this design is a potentially better spray pattern for reactants onto the beds. A disadvantage however is that the seal diameter is larger for this design than one for rotating beds.

In FIG. 9, however, the automotive type direct injectors are replaced with fuel and water rotating valve assemblies 67, 68 located adjacent to the two stators of the RVPSR and which control the flow of high pressure liquids from a stationary external source into the rotating reformer beds. Much like the aforementioned high temperature rotary valve stator/seal assemblies, rotating valve assemblies 67, 68 comprise a stationary flat face stator that provides the counter surface for a rotating flat face seal. Suitable ports are machined on the rotating seal and stator. As the rotating seal rotates, the ports on the seal and stator will line up, allowing liquid to pass through from the stationary external source. The placement of the ports on the stators and rotating seals determines the precise timing of the fuel and water flow into the reformer beds. And, the required timing of fuel and water flow is determined by the desired reforming cycle of the beds. In FIG. 9, each reformer bed is provided with its own fuel pipe 64, water pipe 65, and associated atomizing nozzles 66. When the orientation of the rotating valve assemblies 67, 68 results in liquid being admitted to the pipes, liquid flows through pipes 64, 65 and the pressure is high enough to atomize the liquid through the nozzles. The amount of flow through the nozzles is controlled by the liquid pressure. External liquid pumps (not shown) are used to vary this pressure appropriately. The timing of the liquid spray into the reformer beds is controlled by the length of the ports in the rotating valve assemblies 67, 68.

In FIG. 9, the two rotating valve assemblies are located at opposite ends of the RVPSR in order to eliminate contamination between the water and fuel. However, it may be possible to combine both fuel and water valves into a single rotating valve assembly if leakage characteristics allow. This would reduce part count and reduce size of the unit.

The embodiment of FIG. 9 offers several advantages over the direct injector embodiments in the previous figures. For instance, a continuous and optimized fuel spray pattern can be provided onto the reformer beds which should result in optimal reformer performance. The overall size and cost of the RVPSR may be reduced by replacing the direct injectors with these rotating valve assemblies. Further still, a sophisticated electrical control system for actuating the direct injectors according to a variable duty cycle (to control the flow rate) is not required.

The present application has been described with reference to examples of preferred embodiments. It will be apparent to those of ordinary skill in the art that changes and modifications may be made without departing from this invention. For instance, the principles of the rotating high temperature valve design may be applied in other situations requiring high temperature seals.

The invention claimed is:

1. A pressure swing reformer, comprising:
   a reformer bed assembly comprising greater than two reactor beds, wherein each of the reactor beds has a feed end and a product end, wherein at least one of the reactor beds contains a reforming catalyst;
   one or more valves located at the feed end of each of the reactor beds;
   one or more valves located at the product end of each of the reactor beds; and
   one or more interconnections between the one or more valves located at the feed end and the one or more valves located at the product end of each of the reactor beds, wherein the one or more interconnections are configured to provide for pressure equalizations between the reactor beds.

2. The pressure swing reformer of claim 1 wherein the one or more interconnections allow for an interconnection between the product ends of one or more pairs of the reactor beds.

3. The pressure swing reformer of claim 1 wherein the one or more interconnections allow for an interconnection between the product ends of more than two of the reactor beds.

4. The pressure swing reformer of claim 1 wherein the one or more interconnections allow for interconnection between the feed ends of more than two reactor beds.

5. The pressure swing reformer of claim 1 wherein the reformer bed assembly comprises nine reactor beds.

6. The pressure swing reformer of claim 1 further comprising one or more feed end rotary valves, wherein the one or more valves located at the feed end of each of the reactor beds are incorporated into the one or more feed end rotary valves.

7. The pressure swing reformer of claim 1 further comprising one or more product end rotary valves, wherein the one or more valves located at the product end of each of the reactor beds are incorporated into the one or more product end rotary valves.

8. The pressure swing reformer of claim 1, further comprising one or more equalization ports operatively located between the one or more valves located at the feed end of each of the reactor beds and the product end, wherein the one or more interconnections are configured to provide for pressure equalizations between the reactor beds.

9. A method of pressure swing reforming fuel and water, the method comprising:
   providing a pressure swing reformer comprising:
   a reformer bed assembly comprising greater than two reactor beds, wherein each of the reactor beds has a feed end and a product end;
   one or more valves located at the feed end of each of the reactor beds;
   one or more valves located at the product end of each of the reactor beds; and
   one or more interconnections between the one or more valves located at the feed end and the one or more valves located at the product end of each of the reactor beds, wherein the one or more interconnections are configured to provide for pressure equalizations between the reactor beds; and sequentially performing in each reactor bed of the reformer bed assembly the repeated steps of:
   pressurizing a first one of the reactor beds at its feed end with fuel and water while the one or more valves located at the product end thereof is kept closed;
   reforming fuel and water in the first one of the reactor beds while continuing to admit fuel and water at the feed end thereof and while the one or more valves located at the product end thereof is kept open, thereby preserving a syngas product from the product end thereof;
   supply equalizing from the first one of the reactor beds, wherein a product gas from one of the ends of the first one of the reactor beds is supplied to one of the ends of a second one of the reactor beds, wherein the product gas from the first one of the reactor beds has a higher pressure than a pressure of the second one of the reactor beds;
   exhausting a remaining portion of the product gas from the first one of the reactor beds from its feed end;
   regenerating the first one of the reactor beds by supplying fuel and oxidant to the product end thereof while the one or more valves located at the feed end thereof is open, thereby exhausting regeneration fuel gas from the feed end thereof; and
   pressure equalizing the first one of the reactor beds, wherein a product gas from one of the ends of a third one of the reactor beds is provided to one of the ends of the first one of the reactor beds, wherein the product gas from the third one of the reactor beds has a higher pressure than a pressure of the first one of the reactor beds.

10. The method of claim 9 wherein the supply equalizing step further comprises supplying the product gas from the product end of the first one of the reactor beds-to the product end of the second one of the reactor beds.

11. The method of claim 9 wherein the pressure equalizing step further comprises providing the product gas from the product end of the third one of the reactor beds to the product end of the first one of the reactor beds.

12. The method of claim 9, further comprising:

supply purging from the first one of the reactor beds following the supply equalizing step wherein product gas from the product end of the first one of the reactor beds is supplied to the product end of a fourth one of the reactor beds wherein the at least one valve located at the product end of the fourth one of the reactor beds is open to ambient; and purging the first one of the reactor beds following the regenerating step, wherein a product gas from the product end of a fifth one of the reactor beds is provided to the product end of the first one of the reactor beds while the valves located at the feed end of the first one of the reactor beds is open to ambient.

13. The method of claim 9 further comprising a steam pushing step comprising pushing syngas out of the first one of the reactor beds with high pressure steam following the reforming step, whereby the supply and pressure equalizing steps reduce the amount of high pressure steam employed.

14. The method of claim 9 wherein the exhausting step further comprises any of:

opening the feed end of the first one of the reactor beds to ambient, externally purging the first one of the reactor beds, and evacuating the first one of the reactor beds.

15. The method of claim 9 further comprising additional supply equalizing and pressure equalizing steps comprising acts comprising purging, regeneration, and removal of one or more gases from at least one of the reactor beds.

16. The method of claim 9 further comprising providing a pressure swing reformer comprising nine reactor beds.

17. The method of claim 9 further comprising providing a pressure swing reformer comprising:

a feed end rotary valve, wherein the one or more valves located at the feed ends of each of the reactor beds are incorporated into the feed end rotary valve; and a product end rotary valve, wherein the one or more valves located at the product ends of each of the reactor beds are incorporated into the product end rotary valve.

\* \* \* \* \*